UNITED STATES PATENT OFFICE.

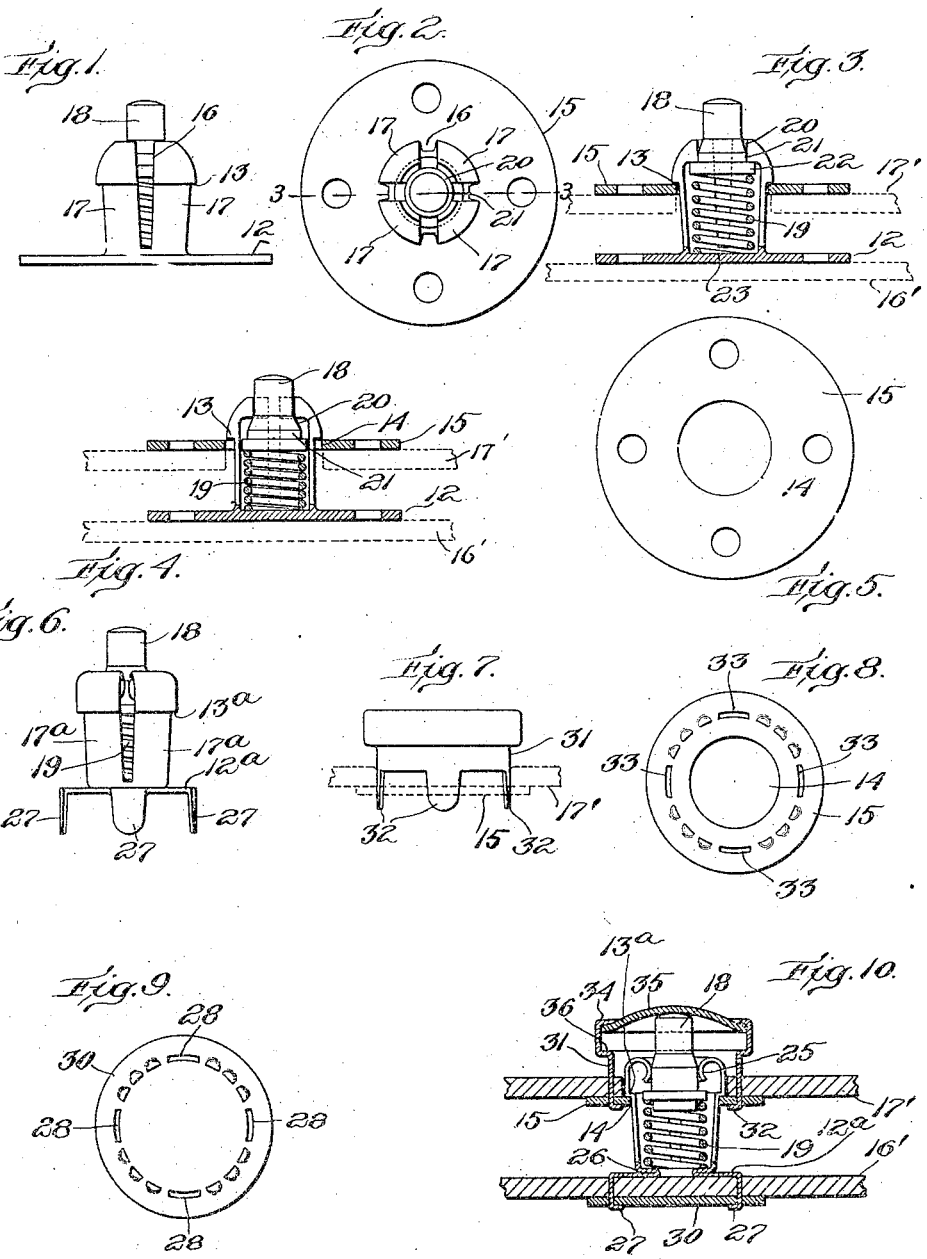

ARTHUR E. ENGLAND, OF BOSTON, MASSACHUSETTS, ASSIGNOR TO CARR FASTENER COMPANY, OF BOSTON, MASSACHUSETTS, A CORPORATION OF MAINE.

STUD AND SOCKET FASTENER.

985,887.          Specification of Letters Patent.          Patented Mar. 7, 1911.

Application filed May 28, 1910. Serial No. 563,951.

*To all whom it may concern:*

Be it known that I, ARTHUR E. ENGLAND, of Boston, in the county of Suffolk and State of Massachusetts, have invented certain new and useful Improvements in Stud and Socket Fasteners, of which the following is a specification.

This invention relates to fasteners for carriage curtains, gloves and other articles, one member of the fastener being a socket which has an inelastic or rigid wall, and the other member a stud adapted to enter the socket and engage the wall thereof in such manner as to resist separation of the members.

The invention has for its object to provide a construction whereby, when the members are interengaged, the stud member will be positively locked to the socket member so that it cannot be withdrawn therefrom until the stud member has been unlocked from the socket member by a special device provided for that purpose.

The invention consists in improvements which I will now proceed to describe and claim.

Of the accompanying drawings forming part of the specification, Figure 1 represents a side view of a stud member embodying my invention. Fig. 2 represents an end view showing said member engaged with an inelastic socket member. Fig. 3 represents a section on the line 3—3 of Fig. 2, showing the stud member locked to the socket member. Fig. 4 represents a view similar to Fig. 3, showing the stud member contracted and unlocked from the socket member. Fig. 5 represents a side view of the socket member shown in Figs. 2, 3 and 4. Fig. 6 represents a side view of a differently constructed stud member embodying my invention. Fig. 7 represents a side view of a portion of a socket member adapted to be used with the stud member shown in Fig. 6. Fig. 8 represents a side view of another portion of the last-mentioned socket member. Fig. 9 represents a side view of the anchoring plate used in securing the stud member shown in Fig. 6. Fig. 10 represents a sectional view showing the stud and socket members represented by Figs. 6 to 9 inclusive, said members being shown applied to the parts which carry them and interlocked with each other.

The same reference characters indicate the same parts in all the figures.

Referring for the present to Figs. 1 to 5 inclusive, the stud member which is shown separately in Fig. 1 includes an attaching base 12, and a tubular body projecting therefrom, said body being provided with a shoulder 13 adapted to engage the wall 14 of an orifice formed in a socket member 15, shown separately in Fig. 5. The attaching base 12 and the socket member 15 may be adapted for attachment in any desired way to the parts 16' and 17' (shown by dotted lines in Figs. 3 and 4) which carry said members. When the fastener is used to connect parts of a glove or other like article, the parts 16' and 17' are both flexible. When the fastener is used to secure carriage curtains, etc., the part 16' which carries the stud member may be a rigid part of the top frame of a carriage.

In the embodiment of my invention here described, the attaching base and the body of the stud member are integral with each other and may be cast, swaged or otherwise formed from any suitable metal. The body of the stud member is longitudinally subdivided by slots 16 into a plurality of resilient sections 17, which are of segmental form in cross section, the outer side of each section carrying a segment of the shoulder 13. The sections 17 are adapted to normally spring inward, as shown by Fig. 4, to reduce the diameter of the shoulder 13 to the minimum, its diameter being less than that of the wall 14 of the orifice in the socket member, as indicated by Fig. 4.

18 represents a plunger which is movable in the tubular body and is normally pressed outward by a spring 19, as shown by Fig. 3. The plunger is provided with a frustoconical displacing portion 20 and with a cylindrical supporting portion 21. The inner sides of the resilient sections 17 are recessed to receive the portions 20 and 21 of the plunger, as shown by Fig. 4, so that when the plunger is pushed inwardly, the sections are permitted to spring inward to their normal positions, thus contracting the shoulder 13. When the plunger 18 is released after being pushed inwardly, the spring 19 automatically projects it, causing the portion 20 to first displace the sections 17 outwardly, thus expanding the shoulder 13, the portion 21 being then caused to bear on the inner sides of the outer end portions of the sections, as shown by Fig. 3, and positively lock or support the same against inward movement. When the shoulder 13 is thus expanded its diameter is greater than that of the socket wall 14, so that the stud and socket members are inseparably interlocked.

The plunger 18 projects from the outer end of the stud member sufficiently to enable pressure to be applied to it to move it from the position shown in Fig. 3 to that shown in Fig. 4. The inner end of the plunger is provided with a head or enlargement 22, constituting a stop member which coöperates with inwardly projecting stop members 22' on the sections 17 in limiting the outward movement of the plunger and preventing its separation from the stud member. The inner end of the spring 19 bears on a seat 23, at the inner end of the body portion of the stud member.

From the foregoing it will be seen that before the stud and socket members can be brought into engagement with each other, the plunger 18 must be pressed inwardly, and that, after said members have been engaged, they cannot be separated until the plunger is again pressed inwardly.

Referring now to Figs. 6 to 10 inclusive, which show a sheet metal construction, 12ª represents the attaching base of the stud member, 13ª the shoulder of the same, and 17ª the resilient sections, these parts being all formed from a sheet metal blank by a series of suitable operations and tools, the sections 17ª being rolled inwardly at their outer ends, as at 25 (Fig. 10), to bear on the plunger 18. The inner portion of the tubular body is contracted at 26 to form a seat for the spring 19. The attaching base 12 is shown as provided with a plurality of flexible prongs 27, which are passed through orifices 28 (Fig. 9) formed for their reception in a plate or washer 30, the base 12ª being placed upon one side of the carrying part 16', the prongs 27 forced through said part and through the plate 30, which is placed on the opposite side of the part 16', the springs 27 being clenched on the under side of the plate 30, as shown in Fig. 10. In this embodiment of the invention the socket member includes in addition to a plate 15 having an inelastic socket wall 14 adapted to engage the shoulder 13ª, a casing 31 formed to cover the outer portion of the stud member. Said casing, which is of sheet metal, is formed to bear on the outer side of the carrying part 17' and has flexible prongs 32 which are forced through the part 17' and are clenched upon the under side of the annular plate 14, which in this case is provided with slots 33 to receive the prongs 32. The casing 31 has at its outer end an inwardly turned flange 34, which confines a push piece 35 bearing on the outer end of the plunger 18. Said push piece is movable between the flange 34 and a suitable stop 36 within the casing, and is adapted to receive pressure from the operator's thumb or finger and to transmit the same to the plunger 18 to move the latter inwardly and cause the contraction of the shoulder 13ª. When the plunger is projected it holds the push piece 35 in its outward position.

I claim,—

1. A stud and socket fastener comprising a tubular stud member having at its inner end portion an attaching base, and at its outer end portion an expansible socket-engaging shoulder which is automatically contracted, and a spring pressed locking plunger adapted to automatically expand the said shoulder and positively hold it expanded, said plunger being displaceable to permit the automatic contraction of the shoulder, the stud member and plunger being provided with complemental stop members which limit the outward movement of the plunger and prevent its separation from the stud member and a socket member having an inexpansible wall formed to engage the expanded shoulder and to pass over the shoulder when the latter is contracted.

2. A stud and socket fastener comprising a stud member having an expansible socket-engaging shoulder which is automatically contracted, and a spring pressed locking plunger adapted to automatically expand the said shoulder and positively hold it expanded, said plunger being displaceable to permit the automatic contraction of the shoulder, and a socket member having an inexpansible wall formed to engage the expanded shoulder and to pass over the shoulder when the latter is contracted, said socket member including a casing and a push piece movable therein and bearing on the plunger.

3. A stud member comprising an attaching base, a tubular body projecting therefrom and provided with a socket-engaging shoulder, said body being composed of a plurality of resilient sections which are attached at their inner ends to the base and are adapted to normally spring inward at their outer ends to contract the shoulder, and a spring-pressed plunger movable between said sections and having a displacing portion formed to move the said sections outwardly and expand the shoulder, and a supporting portion formed to lock the sections against inward movement, the said sections and plunger being provided with complemental stop members which limit the outward movement of the plunger and prevent its separation from the stud member.

In testimony whereof I have affixed my signature, in presence of two witnesses.

ARTHUR E. ENGLAND.

Witnesses:
ARTHUR C. WIDGER,
P. W. PEZZETTI.